United States Patent
Schmidt et al.

(10) Patent No.: US 6,268,826 B1
(45) Date of Patent: Jul. 31, 2001

(54) METHOD AND APPARATUS FOR DETERMINING ANTENNA POINTING PARAMETERS IN A SATELLITE RECEIVER

(75) Inventors: Mark Schmidt; Jim King; Fred Hardy; Clive Holborow, all of San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/182,517

(22) Filed: Oct. 30, 1998

(51) Int. Cl.[7] ............... H01Q 3/00; G01S 5/02; H04B 7/185; G06G 7/78
(52) U.S. Cl. ............... 342/359; 342/357.15; 701/224
(58) Field of Search ............... 342/359, 337.15; 701/224

(56) References Cited

U.S. PATENT DOCUMENTS

| | | | |
|---|---|---|---|
| 3,415,980 | * | 12/1968 | Maieli et al. ............... 701/224 |
| 4,454,658 | * | 6/1984 | Lewis et al. ............... 33/268 |
| 4,743,909 | * | 5/1988 | Nakamura et al. ............... 342/359 |
| 4,862,179 | * | 8/1989 | Yamada ............... 342/426 |
| 5,047,945 | * | 9/1991 | Paluszek ............... 364/434 |
| 5,075,693 | * | 12/1991 | McMillam et al. ............... 342/457 |
| 5,274,926 | * | 1/1994 | Dillon ............... 33/273 |
| 5,396,709 | * | 3/1995 | Swan, Jr. ............... 33/268 |
| 5,471,219 | * | 11/1995 | Rodeffer et al. ............... 342/359 |
| 5,760,739 | * | 6/1998 | Pauli ............... 342/359 |
| 5,860,056 | * | 1/1999 | Pond ............... 342/359 |
| 5,955,988 | * | 9/1999 | Blonstein et al. ............... 342/359 |

FOREIGN PATENT DOCUMENTS

7288416 * 10/1995 (JP).

OTHER PUBLICATIONS

IGRF95 model,, Kyoto University webpage, http://swdcd-b.kugi.kyoto-u.ac.jp:80/igrf/point/, Feb. 1997.*
International Geomagnetic Reference Field, 1995 Revision, NOAA National Data Centers webpage, http://www.ngdc.noaa.gov/seg/potfld/igrf95.shtml unknown.*

* cited by examiner

Primary Examiner—Thomas H. Tarcza
Assistant Examiner—Fred H Mull
(74) Attorney, Agent, or Firm—Ronald P. Kananen; Rader, Fishman & Grauer

(57) ABSTRACT

A method and apparatus for aiming a satellite antenna at a target satellite allow a user to enter a commonly known geographic designator, such as a ZIP Code. From the ZIP Code the longitude and latitude of the antenna is determined. The user also inputs the longitude of the target satellite or the name of the satellite, from which the longitude is looked-up. The system also references a model of variation in Earth's magnetic field so as to determine the variance at the antenna's location and correct the aiming parameters for that variance.

21 Claims, 3 Drawing Sheets

METHOD AND APPARATUS FOR DETERMINING ANTENNA POINTING PARAMETERS IN A SATELLITE RECEIVER

FIELD OF THE INVENTION

The present invention relates to the field of satellite communications. More particularly, the present invention relates to an improved method of determining the initial parameters necessary to correctly aim a satellite dish or antenna at a particular target geosynchronous satellite from which a communications signal is to be received.

BACKGROUND OF THE INVENTION

Geosynchronous satellites are used, for example, to relay data, voice, telephony and analog/digital television signals from an uplink location to one or many users at various downlink locations. Geosynchronous satellites are placed in orbit in the Earth's equatorial plane at an altitude of 35,784 kilometers. At this altitude, the orbital period of the satellite equals one sidereal day (86,156 seconds). In other words, the satellite orbits the Earth at approximately the same speed as the Earth rotates about it's axis. The result is that the satellite appears stationary to observers on the Earth's surface and can relay communications signals along a direct line-of-sight to all earth-based receivers which are not beyond the horizon of the satellite.

Typically, satellite receiving antennas include a parabolic reflecting dish that focuses the transmitted satellite signal onto an antenna feed. The feed converts the electromagnetic wave energy to electrical signals that can be decoded and/or displayed by the equipment of the end user, for example, a television set.

Because the transmission of communications signals from the satellite is along a direct line-of-sight path, an antenna used to receive such signals from geosynchronous satellites must be pointed accurately toward the satellite in its orbital position. Antennas with large dish apertures have a higher gain than smaller dishes and, therefore, require more accurate aiming at the broadcasting satellite. The dish aperture is the shape of the antenna as viewed down its boresight axis.

The parameters used to describe the direction in which a satellite antenna is pointed are typically azimuth (measured in degrees from the direction of true North at the antenna site) and elevation (measured in degrees from the local horizontal plane). The necessary azimuth ("AZ") and elevation ("EL") to aim an antenna at a particular satellite are easily determined from simple geometric considerations once the latitude and longitude of the antenna, and the longitude of the satellite being targeted are known.

FIG. 1 illustrates a typical satellite dish 101 which is aimed to communicate with a satellite 102 in geosynchronous orbit. As illustrated, the elevation (EL) of the dish is the angle between the radio axis of the dish and the horizontal plane. The azimuth (AZ) of the dish is the angle between the vertical plane containing the radio axis of the dish and true North (N).

Satellite antenna systems typically include the necessary electronic components for monitoring the antenna's azimuth and elevation. Motorized systems capable of moving the antenna can then be placed in a feedback loop with the azimuth and elevation monitoring systems. With such a loop, the antenna can be automatically moved from a known orientation to one in which is it accurately aimed at a target satellite corresponding to a specified azimuth and elevation.

An antenna's azimuth can be roughly measured using a magnetic compass to determine true North. However, because the Earth's magnetic field varies locally at each point on the Earth's surface, the compass reading alone cannot result in a perfectly accurate determination of the antenna's actual azimuth. Therefore, the aim of the satellite will also contain an error factor.

Consequently, there is a need in the art for a method and apparatus of aiming a satellite antenna which more accurately determines the azimuth of the satellite antenna so that the antenna can be more precisely aimed at a target satellite.

SUMMARY OF THE INVENTION

Consequently, it is an object of the present invention to meet the above-described needs and others. Specifically, it is an object of the present invention to provide a method and apparatus for more precisely determining the required azimuth of a satellite antenna so that the antenna can be more accurately aimed. It is an additional object of the present invention that the method and apparatus of the present invention be implemented so that it can be easily operated by the average person without training or technical ability in satellite communications.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a method for aiming a satellite antenna at a target satellite by determining a local magnetic variation in Earth's magnetic field; and calculating an azimuth at which the antenna is to be aimed which is corrected for the local magnetic variation. The determination of the local magnetic variation is accomplished by receiving location designation data from a user which designates a location of the antenna; and determining the local magnetic field variation corresponding to that location.

Determination of the local magnetic field variation is performed using a model which represents variations in Earth's magnetic field. Preferably, the model used is the International Geomagnetic Reference Field (IGRF) model.

When receiving location designation data, the system of the present invention may be receiving the longitude and latitude of the antenna if known and input by the user. Alternatively, the system may be receiving location designation data comprising a well-known location designator, such as the ZIP Code of the antenna, input by the user. Where the ZIP Code is input, the method of the present invention includes matching the ZIP Code to a longitude and latitude of the ZIP Code.

The method also includes receiving target satellite designation data from the user. Receiving target satellite designation data may include receiving the longitude of the target satellite if it is known to and input by the user. Alternatively, the method may include receiving a name of the target satellite from the user and determining a longitude of the satellite by referencing a look-up table correlating satellite names and longitudes.

The present invention also encompasses a method of aiming a satellite antenna which does not include correcting for local variation in the Earth's magnetic field. Such a method includes the steps of receiving a ZIP Code input by a user; from the ZIP Code, determining a latitude and longitude of the antenna; and calculating an azimuth at which the antenna is to be pointed to receive signals from the target satellite based on the latitude and longitude.

This method also includes receiving a designation of the target satellite input by a user; from the designation, determining a longitude of the satellite; and calculating an azimuth and elevation at which the antenna is to be pointed to receive signals from the target satellite based on the latitude and longitude of the antenna and the longitude of the satellite.

The present invention also encompasses an apparatus for aiming a satellite antenna at a target satellite which includes a processor; a user input device through which a user can input a designation of a location of the antenna to the processor; and a memory unit connected to the processor. The processor, using the designation of the location of the antenna, accesses a model of local variation of Earth's magnetic field stored in the memory unit, and corrects parameters for aiming the antenna based on variation of Earth's magnetic field at the location of the antenna.

A look-up table is stored in the memory unit which correlates ZIP Codes with latitude and longitude. When a user inputs a ZIP Code as the designation of the location of the antenna, the processor accesses the look-up table in the memory unit to determine latitude and longitude of the antenna.

The apparatus of the present invention may also include a drive unit controlled by the processor for aiming the antenna; and a compass on the antenna for monitoring the azimuth at which the antenna is pointed. The processor controls the drive unit to aim the antenna at the target satellite. If the processor has calculated the location variation in the Earth's magnetic field, the processor controls the drive unit to aim the antenna at the target satellite based on the parameters corrected for the local variation in Earth's magnetic field.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

In general principle, one aspect of the present invention is the use of a look-up table to correct for the local variations in the Earth's magnetic field when a magnetic compass is used to monitor the azimuth of a satellite antenna. The International Geomagnetic Reference Field ("IGRF") model is a recognized standard model developed by the National Space Science Data Center based on empirical measurements of the variations in the Earth's magnetic field. The IGRF model, therefore, can be used to mathematically quantify the Earth's magnetic field as it varies across localities.

Consequently, if the location of a satellite antenna is specified, it is possible to refer to the IGRF model and determine how the Earth's magnetic field varies at the specified location. This variation of the Earth's actual magnetic field from the expected magnetic field can be used to correct the heading given from a magnetic compass to identify true North and an antenna's true azimuth.

Figure 1:
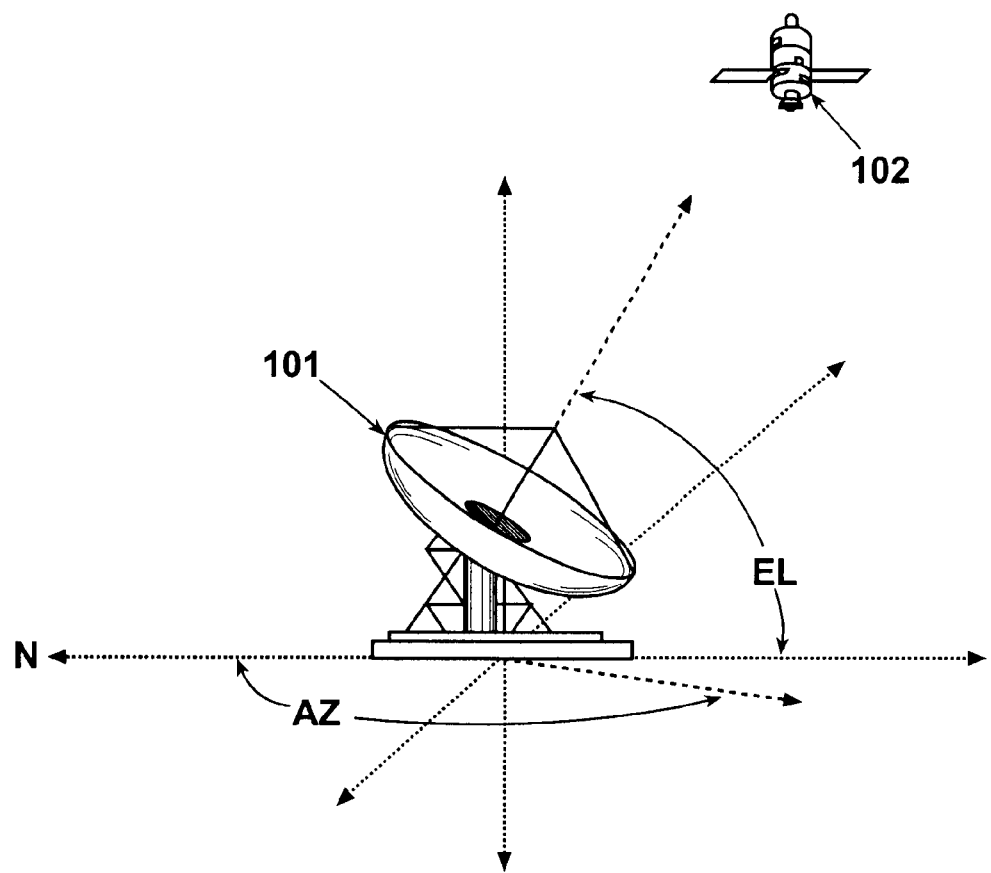
FIG. 1 is an illustration of a conventional satellite antenna.
Figure 2:
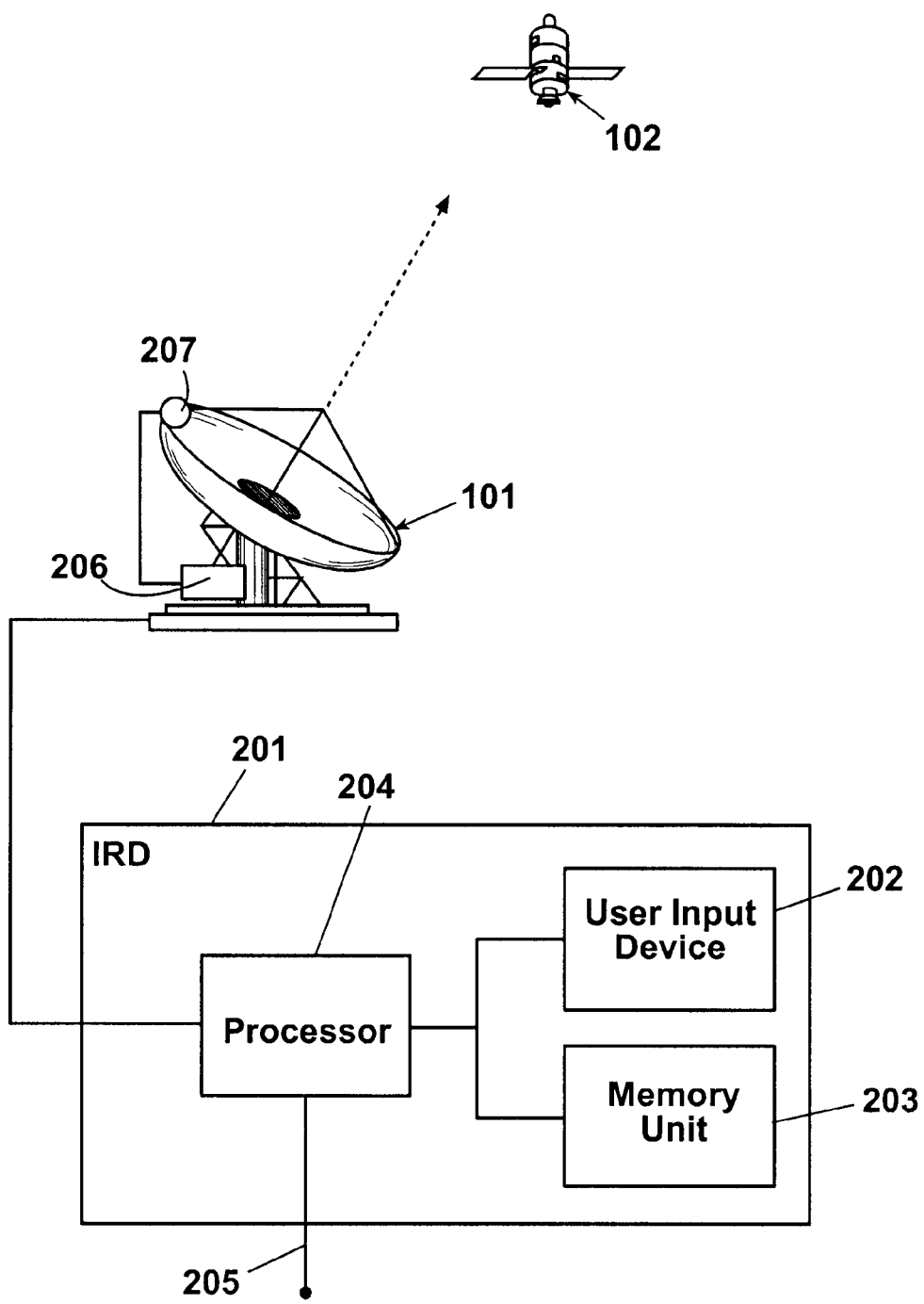
FIG. 2 is an illustration of a satellite antenna and associated electronics according the present invention.

Using the drawings, the preferred embodiments of the present invention will now be explained. As shown in FIG. 2, the present invention includes a system for controlling a satellite antenna 101 to accurately aim the antenna 101 at a target satellite 102. The satellite antenna 101 has a drive system 206 which moves the antenna 101 to target different orbiting satellites. A magnetic compass 207 may be located on the dish 101 itself so as to provide a means by which the drive system 206 can monitor the azimuth of the antenna 101.

Typically, when a satellite antenna is being used to receive, for example, television signals, a set-top terminal which is located with and connected to the television set is used to provide the television signals from the satellite antenna to the television. Such a set-top terminal includes an integrated receiver/decoder ("IRD") (201).

In the present invention, the drive system 206 of the antenna 101 is controlled by and communicates with a processor 204 which is part of the IRD 201. The IRD 201 and the processor 204 include a terminal 205 by which the IRD 201 is connected to a television set (not shown).

The IRD 201 of the present invention also includes a user input device 202. The user input device 202 can be any of a number of equivalent devices. For example, the user input device 202 may include a keyboard or keypad which is located on, connected to or in communication with the IRD 201. Alternatively, the user input device 202 may include a receiver, such as optical (IR), acoustic (ultrasonic), or radio frequency (RF) receiver, for receiving data signals transmitted by a remote control unit (not shown). In short, the user input device 202 may be any device with which a user can input data to the processor 204 of the IRD.

In the present invention, the user would, through the user input device 202, input the necessary data to target a desired satellite with the satellite antenna 101. As noted above, the first piece of data that must be known by the processor 204 to target a satellite is the geographic position of the antenna 101. If the user knows his or her longitude and latitude, that data can be input to the processor 204 with the input device 202.

However, an object of the present invention is to allow a user to designate his or her location without knowing uncommon information such as his or her longitude and latitude. Consequently, under the principles of the present invention, the user can input some more common designation of his or her location. For example, a postal code, in the United States, a ZIP code, may be entered with the user input device 202.

While use of a postal code is a simple manner in which an average user can designate his or her location with a commonly-known piece of data, the present invention is not so restricted. Any similar well-known or easily communicated location designator can be used within the scope and spirit of the present invention. For example, a telephone code such as area codes and prefixes may conceivably be used.

Figure 3:
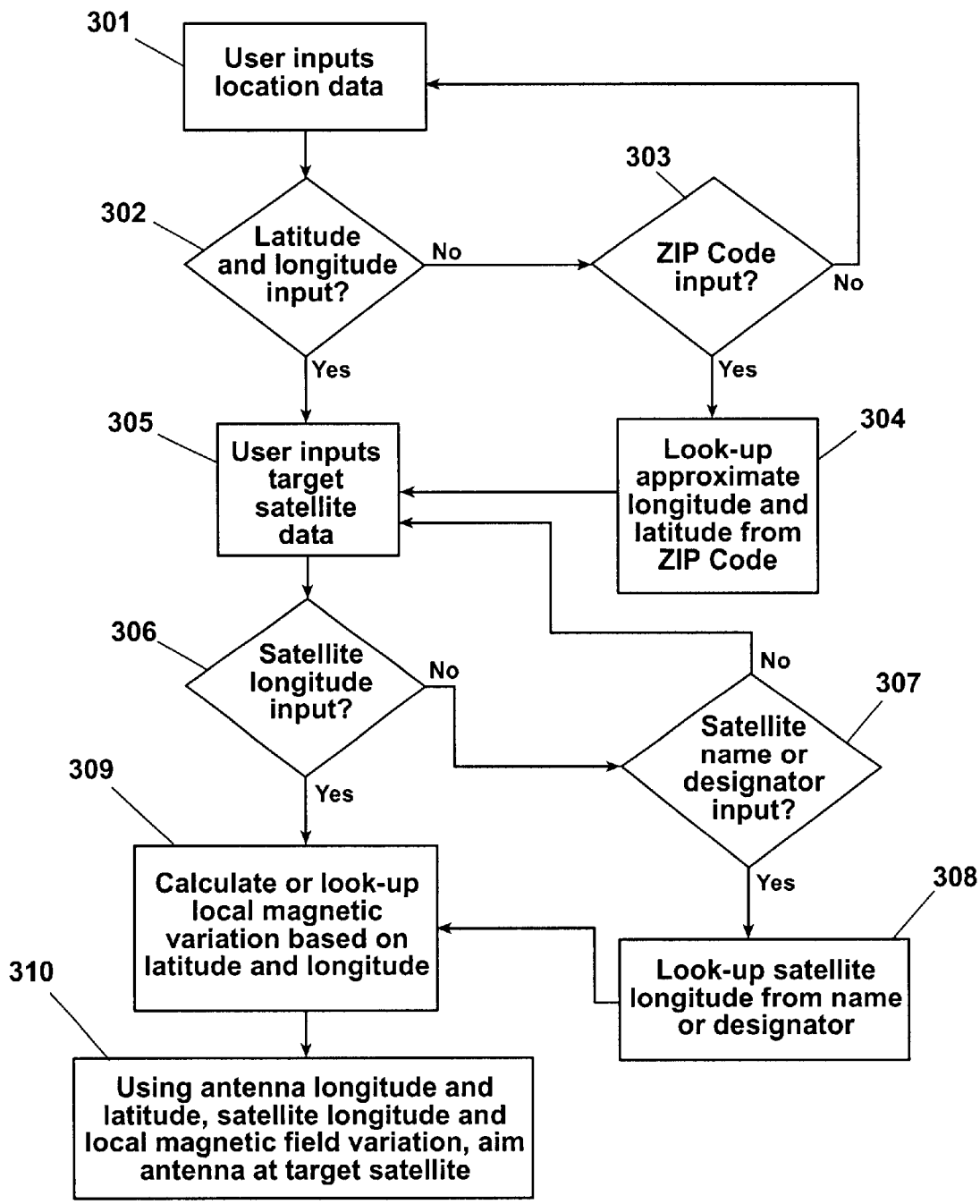
FIG. 3 is a flow chart showing the steps of the method of the present invention for accurately aiming a satellite antenna at a target satellite.

The process for using the system of the present invention, which is shown in FIG. 2, is illustrated in FIG. 3. Thus, both FIGS. 2 and 3 will be referenced in the following discussion.

As shown in FIG. 3 at block 301, the user inputs location data into the IRD 201 with the input device 202. The location data is then received by the processor 204. At block 302, the processor 204 will determine if the user has input the latitude and longitude of the antenna 101. If the latitude and longitude have been input, the processor 204 proceeds to block 305.

If the user has not entered the latitude and longitude, the processor 204, at block 303, will determine if the user has input another common location designator, i.e., a ZIP Code. If not, the processor 204 returns to block 301 and waits for the user to enter an appropriate location designator.

If the ZIP Code is entered, the processor, at block 304, accesses a look-up table stored in the memory unit 203. The look-up table will match the input ZIP Code with the latitude and longitude of that ZIP Code.

As will be appreciated by those skilled in the art, the user will only need go through blocks 301 to 304 once. Thereafter, the latitude and longitude of the antenna 101 will be known and can be stored by the processor 204 in the memory unit 203. Only if the antenna 101 is relocated will the user need to re-specify the location of the antenna.

The processor then proceeds to block 305 at which the user inputs data specifying the target satellite. At block 306, the processor 204 will determine if the user has simply input the satellite longitude. If the user has, the processor 204 moves to block 309. If the user has not, the processor, at block, 307 determines if the user has input a satellite name or other designator 307.

If the user has not entered a satellite designator, the processor 204 moves back to block 305 and waits for the user to input satellite data. If the user has entered a recognized satellite name or designator, the processor 204, at block 308, accesses the memory unit 203 for a look-up table which will associate the satellite's name or designator with its longitude.

Having the latitude and longitude of the antenna, the processor 204 determines the parameters that define the local variation of the Earth's magnetic field. The processor 204 may do this by calculating the necessary parameters directly from the IGRF model or may again accesses the memory unit 203 for a look-up table that will associate the latitude and longitude of the antenna 101 with the parameters defining the local magnetic field.

Then, at block 310, the processor 204 uses the accumulated data, i.e., the latitude and longitude of the antenna 101, the longitude of the target satellite 102 and the local variation in the magnetic field to quickly and accurately calculate the proper AZ and EL necessary to aim the antenna 101 at the target satellite 102. The process may display the calculated AZ and EL on the screen of the connected television set.

In this manner, the antenna 101 can be set up and aimed by those without special skills or training. Moreover, the errors in aiming the antenna which arise from an azimuth incorrectly determined due to local variance in the Earth's magnetic field can be compensated for and eliminated.

The details for having the processor 204 of the IRD 201 determine the true azimuth and elevation to accurately aim an antenna 101 at a target satellite 102 will now be described. In the following equations, $lat_e$ and $lon_e$ are the latitude and longitude of the antenna 101, respectively. $R_s$ is the radius of the geosynchronous satellite orbit (42,162.14 km), $R_e$ is the mean radius of the Earth (6378.145 km), and $lon_s$ is the longitude of the target satellite. We may ignore the oblate spheroidal shape of the earth as well as the height above mean sea level of the antenna 101. These omissions have very small effects on the actual AZ/EL calculation. Consequently, azimuth and elevation may be calculated as follows.

$$R=(R_s^2+R_e^2-2R_sR_e \cos(lat_e)\cos(lon_s-lon_e))^{1/2}$$

$$EL=\arcsin((R_s \cos(lat_e)\cos(lon_s-lon_e)-R_e)/R)$$

$$AZ=\arctan((\sin(lon_s-lon_e))/-\sin(lat_e)\cos(lon_s-lon_e))$$

Special care should be taken in the calculation of the true AZ since arctan(x) is typically defined over the range $[-\pi/2, \pi/2]$; that is, positive x arguments give the same arctan(x) value regardless of whether the desired angle lies in $[0,\pi/2]$ or $[\pi, 3\pi/2]$. For antennas located in the northern hemisphere, true AZ lies in the range $(\pi/2, 3\pi/2)$. The proper calculation can be made using the ANSI C atan2 (y,x) function with compensation for negative results:

$$AZ=180.0 \cdot \text{atan } 2(\sin(lon_s-lon_e),-\sin(lat_e)\cdot\cos(lon_s-lon_e))/\pi$$

If (AZ<0.0) then AZ=AZ+360.0°, where AZ has been converted to degrees before checking and compensating for a negative result.

In order to perform these calculations, as described above, the latitude and longitude of the antenna 101 must be determined, preferably by the user inputting a basic, widely known geographic designator. If, under the principles of the present invention, the U.S. ZIP Code is used as the geographic identifier, the processor 204 must have data stored in the memory unit 203 which correlates ZIP Codes with latitude and longitude. These ZIP code data are commercially available and are periodically updated.

The most straightforward approach to deriving latitude and longitude from a ZIP code is to simply let the 5-digit ZIP code serve as the address into a table storing latitude and longitude. Since possible ZIP code values range from 00000 to 99999 this table would be about half empty because only 43907 ZIP codes are currently used in the United States. Assuming latitude and longitude could each be represented by one byte, the present invention would require a linear storage space of 200 kilobytes for the data correlating ZIP Codes and latitude/longitude. Clearly, some compression of this data would be preferable.

The latitude/longitude data must be stored as quantized values. To accomplish this, a grid spacing of latitude and longitude can be chosen across, for example, North America. We then determine the AZ/EL and boresight pointing error obtained when the next nearest latitude and longitude grid point is used in the calculations instead of the actual latitude/longitude.

With a grid in units of one degree latitude/longitude, we find that only 1078 latitude/longitude values are required to represent all the US ZIP codes in commercially available files to these one degree quantization values. It takes less than one byte of storage for each latitude and longitude quantized to one degree across the area of interest. The resulting maximum AZ/EL errors for a 110 W satellite are 1.3°/0.7°, and for a 119 W satellite are 1.2°/0.8°, respectively. The maximum boresight pointing error obtained for this grid is less than 0.8°.

If the grid spacing is reduced to 0.5°, the maximum AZ error reduces to less that 0.7° and the maximum boresight error reduces to 0.4°. However, the required number of grid points to represent all the ZIP code entries under consideration increases to 3,510. Notice also that a pointing error of 0.8° for a 45 cm (18 inch) dish results in less than 0.6 dB point loss and less than 0.35 dB for a 33 cm (13 inch) dish.

Although quantization of latitude/longitude to 1.0 or 0.5 degree grid spacing dramatically reduces the number of latitude/longitude points that must be stored in memory unit 203, the problem remains of mapping a given ZIP code to one of these points. Although ZIP codes are grouped roughly geographically they do not submit to simple truncation strategies. For example, the following ZIP codes map to the following latitude/longitude on a one degree grid:

| ZIP CODE | LAT/LONG |
|---|---|
| 92220 | 34/−117 |
| 92222 | 33/−115 |

Thus, a truncated address such as 922 or 9222 cannot serve to look-up the desired latitude/longitude in this case. However, the inventors have discovered that the ZIP codes from 02000 to 02534 all can be represented by a latitude of 42° and a longitude of −71° in a one degree grid spacing, while 02535 quantifies to a latitude/longitude of 41°/−71°. Thus, a look-up table need only store values for the ZIP Codes 02000 and 02535, while any ZIP code lying between these two uses the latitude/longitude stored for 02000. Similar instances at which the data stored can be truncated will likely be found.

Furthermore, it is preferable to store only a ZIP code offset in an indexing table of the look-up table rather than the full 5 decimal digit ZIP code. By storing only the offset value, i.e., ZIP(j)=ZIP(j−1)+offset(j), the number of bits needed for index recovery is reduced. The algorithm simply accumulates offsets until the user-defined ZIP code value is exceeded. If the algorithm terminates at the $j^{th}$ index then the $(j-1)^{st}$ serves as the address for a latitude/longitude look up. For the one degree grid spacing it takes 18,926 stored one-byte offset values to represent all 43,907 ZIP codes.

This indexing algorithm will take 18,926 bytes to store the ZIP code offsets and another 2×18,926 bytes to store the latitude/longitude quantizations for a total of 56.8 Kbytes for the one degree spacing example. However, because the total number of distinct, one degree spaced latitude/longitude grid points needed to represent the ZIP codes is only 1,078, such a table of distinct grid point values would require a 2,048 element (11 bit) linear address space. Thus, more space storage space can be saved by storing only the 18,926 11-bit addresses in some bit compacted method (spanning byte boundaries) and then have a smaller (2,048×2 byte) table of latitude/longitude. This results in a total of 18,926 bytes for ZIP offsets, 18,926×11/8=26,024 bytes for latitude/longitude indices and 4,096 bytes for latitude/longitude resulting in 49.05 Kbytes of storage required in memory unit 203.

To reduce the memory requirements even further, the ZIP offsets can be limited to 5-bits so that the 11-bit latitude/longitude address and the 5-bit offset can be stored in a single two byte word. Using this approach to the algorithm results in a memory unit 203 storage requirement of 20,298×2 bytes=40.6 kilobytes plus 4,096 bytes for latitude/longitude.

In its barest form, the algorithm of the present invention provides no error checking against an invalid ZIP code user entry. However, methods for verifying ZIP entries could include storing a 100,000 bit string where a "one" at bit location ZIP implies a valid code and "zero" an invalid code. This requires 12.5 kilobytes of additional storage. This additional memory burden may be reduced considerably using a run-length coding algorithm.

Finally, the details of determining the local magnetic variation will be explained. As mentioned briefly above, a magnetic compass is deflected from true north by variations in the local geomagnetic field. Magnetic north varies at every location on the Earth's surface. For example, in San Diego, Calif. in 1999 a compass indicating magnetic north will read 13.1° east from true north. Consequently, if aiming at a target satellite with an azimuth of 200° from true north, the azimuth that should be selected, as measured by a compass reflecting local north, is 200°−13.1°=186.9°. Moreover, the magnetic north pole moves about 2 arc minutes west each year, as measured from San Diego, Calif. This drift can also be accounted for in the calculations performed by the processor 204.

The method for correcting an azimuth calculation for aiming a satellite antenna using the IGRF model in North America is as follows. First the user inputs the geographic designation which either is, or is reduced to, latitude (lat) and longitude (lon).

$lat_1$=the largest integer<(lat−6°)/2

$lon_1$=the largest integer<(lon−188°)/2

Once $lat_1$ and $lon_1$ are determined, parameters must be retrieved from the table of values provided by National Space Science Data Center as part of the IGRF model.

$f_{00}$=magnetic variation $[lat_1][lon_1]$
$f_{10}$=magnetic variation $[lat_1][lon_1+1]$
$f_{01}$=magnetic variation $[lat_1+1][lon_1]$
$f_{11}$=magnetic variation $[lat_1+1][lon_1+1]$ Fractional parts of latitude and longitude, p and q, respectively, relative to the 2° spacings are found by:

$p=(lon-2\lfloor lon/2 \rfloor)/2;$ and $q=(lat-2\lfloor lat/2 \rfloor)/2;$ where $\lfloor x \rfloor$=the largest integer less than or equal to x. Given these parameters, the correction for local magnetic variance $\theta_m$ is calculated by a two-dimensional interpolation as follows:

$\theta_m=(1-p)(1-q)f_{00}+p(1-q)f_{10}+q(1-p)f_{01}+(p \cdot q f_{11})$

The corrected azimuth is then calculated as follows:

$Az_{compass}=AZ-\theta_m$

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method for aiming a satellite antenna at a target geosynchronous satellite comprising:

determining a local magnetic variation in Earth's magnetic field;

electronically calculating an azimuth at which said antenna is to be aimed; and correcting said calculated azimuth for said local magnetic variation.

2. A method as claimed in claim 1, wherein said determining a local magnetic variation further comprises:

receiving location designation data from a user designating a location of said antenna; and determining said local magnetic variation corresponding to said location.

3. A method as claimed in claim 2, wherein said determining said local magnetic variation is performed using a model representing variations in Earth's magnetic field.

4. A method as claimed in claim 3, wherein said using a model comprises using the International Geomagnetic Reference Field model.

5. A method as claimed in claim 2, wherein said receiving location designation data comprises receiving a longitude and latitude of said antenna input by said user.

6. A method as claimed in claim 2, wherein said receiving location designation data comprises receiving a ZIP Code of said antenna input by said user.

7. A method as claimed in claim 6, wherein said receiving location designation data further comprises matching said ZIP Code to a longitude and latitude of said ZIP Code.

8. A method as claimed in claim 1, further comprising receiving target satellite designation data from a user.

9. A method as claimed in claim 8, wherein said receiving target satellite designation data comprises receiving a longitude of said target satellite.

10. A method as claimed in claim 8, wherein said receiving target satellite designation data comprises:

receiving a name of said target satellite; and determining a longitude of said satellite by referencing a look-up table correlating satellite names and longitudes.

11. A method of aiming a satellite antenna at a target satellite comprising:

receiving a ZIP Code input by a user;

correlating said ZIP Code to a local variation of Earth's magnetic field; and calculating an azimuth at which said antenna is to be pointed to receive signals from said target satellite based on said local variation of Earth's magnetic field.

12. A method as claimed in claim 11, further comprising:

correlating said ZIP Code to a latitude and longitude of said antenna;

receiving a designation of said target satellite input by a user;

from said designation, determining a longitude of said satellite; and calculating an elevation at which said antenna is to be pointed to receive signals from said target satellite based on said latitude and longitude of said antenna and said longitude of said satellite.

13. An apparatus for aiming a satellite antenna at a target satellite comprising:

a processor;

a user input device through which a user can input a designation of a location of said antenna to said processor; and a memory unit connected to said processor;

wherein said processor, using said designation of a location of said antenna, accesses a model of local variation of Earth's magnetic field stored in said memory unit, and corrects parameters for aiming said antenna based on variation of Earth's magnetic field at said location of said antenna.

14. An apparatus as claimed in claim 13, further comprising a look-up table stored in said memory unit which correlates ZIP Codes with latitude and longitude, wherein, when a user inputs a ZIP Code as said designation of said location of said antenna, said processor accesses said look-up table in said memory unit to determine latitude and longitude of said antenna.

15. An apparatus as claimed in claim 14, further comprising:

a drive unit controlled by said processor for aiming said antenna; and a compass on said antenna for monitoring an actual azimuth at which said antenna is pointed;

wherein said processor controls said drive unit to aim said antenna at said target satellite.

16. An apparatus as claimed in claim 13, further comprising:

a drive unit controlled by said processor for aiming said antenna; and a compass on said antenna for monitoring an actual azimuth at which said antenna is pointed;

wherein said processor controls said drive unit to aim said antenna at said target satellite based on said parameters corrected for said local variation in Earth's magnetic field.

17. A method as claimed in claim 2, wherein said receiving location designation data comprises receiving a portion of a telephone number of said user, including at least an area code, that is input by said user.

18. A method as claimed in claim 17, wherein said receiving location designation data further comprises matching said portion of a telephone number to a longitude and latitude of said antenna.

19. A method as claimed in claim 1, wherein said calculating an azimuth at which said antenna is to be aimed further comprises accounting for drift of Earth's north pole over time when calculating said azimuth.

20. An apparatus as claimed in claim 13, further wherein said processor further corrects said parameters for aiming said antenna based on drift over time of Earth's north pole.

21. A method as claimed in claim 6, wherein said receiving location designation data further comprises:

matching each available ZIP Code to a point on a grid, with regular spacing between grid points, wherein each grid point is assigned a corresponding latitude and longitude; and using a latitude and longitude assigned to a grid point to which said input ZIP Code is matched as a latitude and longitude of said antenna;

wherein said determining said local magnetic variation corresponding to said location is performed using said latitude and longitude assigned to said grid point to which said input ZIP Code is matched as an approximation of said latitude and longitude of said antenna.

* * * * *

UNITED STATES PATENT AND TRADEMARK OFFICE
CERTIFICATE OF CORRECTION

PATENT NO. : 6,268,826 B1  Page 1 of 1
DATED : July 31, 2001
INVENTOR(S) : Mark Schmidt, Jim King, Fred Hardy and Clive Holborow It is certified that error appears in the above-identified patent and that said Letters Patent is hereby corrected as shown below:

<u>Title page,</u>
The Assignee should read:
-- [73] Assignee: General Instrument Corporation, Horsham, PA
Motorola Inc., Schaumburg, IL --

Signed and Sealed this

Thirtieth Day of July, 2002

*Attest:*

*Attesting Officer*

JAMES E. ROGAN
*Director of the United States Patent and Trademark Office*